June 16, 1942.         R. B. COTTRELL ET AL         2,286,845
SNUBBER
Filed Aug. 24, 1939
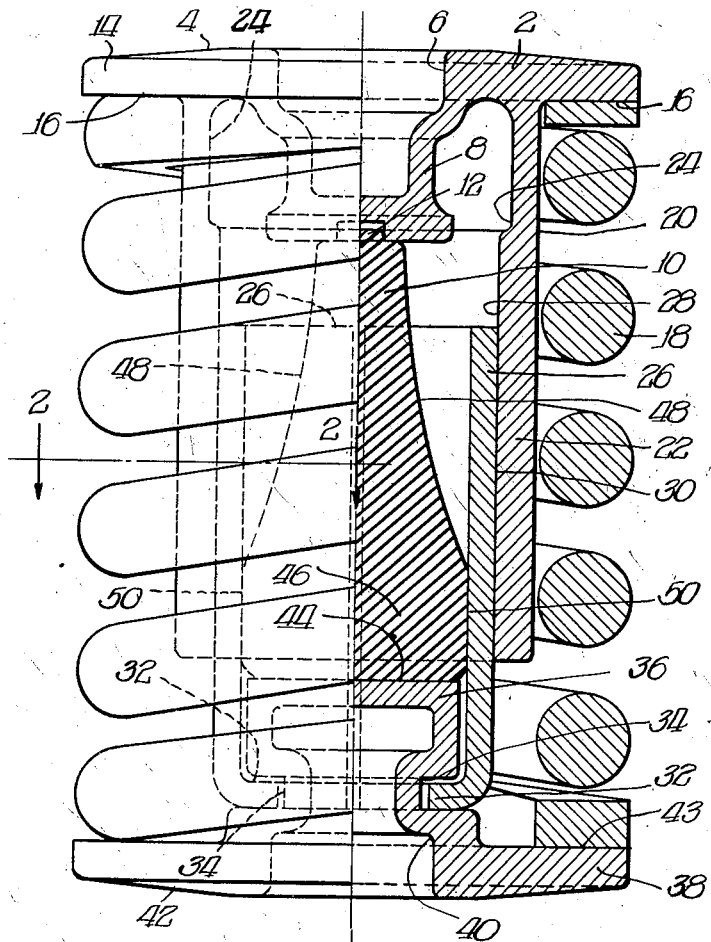
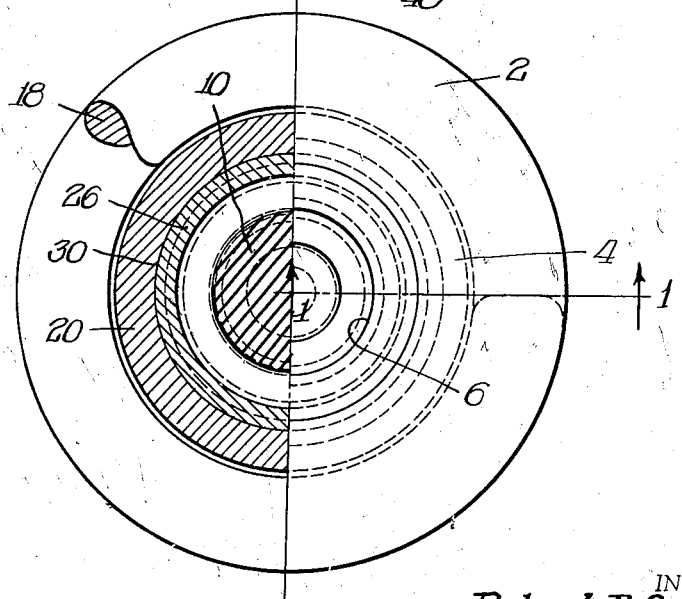
INVENTORS.
Robert B. Cottrell,
William S. Spieth
BY
ATTORNEY.

Patented June 16, 1942

2,286,845

UNITED STATES PATENT OFFICE 2,286,845

SNUBBER

Robert B. Cottrell and William S. Spieth, Chicago, Ill., assignors to American Steel Foundries, Chicago, Ill., a corporation of New Jersey Application August 24, 1939, Serial No. 291,634

20 Claims. (Cl. 267—9)

Our invention relates to a friction absorbing or snubbing device, particularly as to a form thereof commonly used in railway car trucks.

An object of our invention is to devise an efficient form of such snubber capable of being used in place of the ordinary outer coil used in railway freight car trucks.

Our invention contemplates the use of a solid block of resilient rubber-like material as a means of urging friction shoes against walls of a follower. Other such devices have utilized such a resilient member for this purpose. The manner in which such a block is used, however, has great bearing upon its length of life and, therefore, its utility. Among other requirements it is necessary that the rubber element be not unduly abraded at the surfaces which come into contact with metal parts because such abrasion tends to rupture and destroy the resilient member.

Our invention contemplates an arrangement which will reduce to a minimum the rubbing which takes place against the rubber-like resilient member, thus overcoming certain of the handicaps heretofore experienced in such a device.

A different object of our invention is to design a snubber having the above mentioned desirable characteristics and at the same time maximum simplicity of parts while conforming to the standard requirements of manufacture and service.

Figure 1 is a view in elevation, partly in section, of an embodiment of our novel friction absorbing device, the section being taken in the vertical plane bisecting the device substantially as indicated by the line 1—1 of Figure 2.

Figure 2 is a plan view, half in section, the section being taken in the horizontal plane substantially as indicated by the line 2—2 of Figure 1.

Describing the structure in detail, it may be noted that our novel friction absorbing device comprises the top follower or housing 2 having an outer face of somewhat arcuate form as indicated at 4 serving as a convenient seat for one end of the mechanism, said follower having the centrally formed cavity or opening 6 defined by the walls of the inwardly directed stud 8 of spool-like form, the outer end of said stud serving as a seat for one end of our novel resilient member 10, said resilient member and said stud being afforded positioning means with respect to each other as indicated at 12. The follower 2 has a base of generally circular form comprising the annular flange 14 forming a seat as indicated at 16 for the coil spring 18, and housed or sleeved within said spring is a cylindrical portion 20 integrally formed with a part of the follower 2, said cylindrical portion having relatively thick walls for the major portion of their length as indicated at 22, thus affording maximum metal and area for frictional wear. The said walls are relieved as at 24, 24 to afford clearance for the semi-cylindrical shoes 26, 26 as the device is compressed. The inner surface of the cylindrical portion 20 is finished as at 28 to afford a smooth fit as at 30 with complementary friction surfaces formed on the outer faces of the friction shoes 26, 26. The lower ends of the friction shoes are flanged over as indicated at 32 and received within the annular slot 34 formed around the stud 36, said stud being an integral part of the bottom follower 38. The follower 38 has the centrally formed cavity 40 which together with the cavity 6 at the opposite end of the device forms convenient positioning means. The outer face of the base follower 38 is of somewhat convex form as noted at 42, thus affording a seat similar to the seat 4 at the opposite end of the device and adapted to permit some relative lateral motion of the members between which the device is seated. The inner face of the bottom follower 38 affords a seat 43 for the coil spring 18. The stud 36 serves as a base or seat for the lower end of the resilient member 10 as indicated at 44. The said resilient member 10 is of novel form with a cylindrical body portion 46 adjacent the base thereof of diameter slightly greater than the distance between the opposite shoes 26, 26 when in assembled position so that the resilient member 10 is under some slight lateral compression after assembly. Above the body portion 46 of the resilient member 10 is tapered somewhat in the form of a frustum of a cone, the sides of which are slightly concave as noted at 48, 48. The length of the resilient member 10 is slightly greater than the distance between the opposing faces of the studs 8 and 36 on the respective followers when the device is in normal assembled position so that the resilient member 10 is somewhat compressed lengthwise as well as laterally when the parts are in normal assembled relationship. The resilient member 10 is thus under sufficient compression after the parts are assembled to afford pressure against the shoes as at 50, 50. The friction thus developed between the shoes and the top follower acting together with the interlocking flanges at the bottom of the shoes serve to retain the shoes in normal assembled relationship. It will be understood of course that after such a device is placed in service it is normally under some load so that the parts would not be likely to become dismantled in service.

As our novel device is placed under load the resilient member may be further compressed, thus urging the shoes 26, 26 outwardly with greater force against the cylindrical walls of the top follower as the shoes are moved upwardly along said walls by the compression of the device. The parts are so proportioned that the resilient member 10 substantially fills the cavity afforded as the device approximates solid height.

It may be noted that with our novel arrangement the resilient member 10 has no sliding engagement with any other member, thus preventing abrasion of its surfaces and affording maximum life for the resilient material.

It is to be understood that we do not wish to be limited by the exact embodiment of the device shown which is merely by way of illustration and not limitation as various and other forms of the device will, of course, be apparent to those skilled in the art without departing from the spirt of the invention or the scope of the claims.

We claim:

1. In a friction absorbing device, top and bottom followers, a coil spring seated therebetween, one of said followers having a cylindrical portion sleeved within said spring, semi-cylindrical shoes received within said portion in frictional engagement therewith, interlocking means on said shoes, and said bottom follower, and a resilient member of conical form seated on said bottom follower with a portion thereof in compression between said shoes and having abutment with said followers at its opposite ends respectively for compression therebetween, said resilient member being arranged to flow freely against said friction shoes as said device is compressed and being free of rubbing or abrasive action thereagainst.

2. In a friction absorbing device, top and bottom followers, a coil spring therebetween, one of said followers having a cylindrical housing extending within said spring, friction shoes having means interlocked with the other of said followers, said shoes being received within said housing for frictional engagement therewith, and a resilient member having a body portion of cylindrical form merging into a portion of frusto-conical form, said cylindrical portion being seated on one of said followers and having abutment with said shoes to urge them into engagement with said housing, and said conical portion having abutment with the other of said followers to afford a means of compressing said resilient member between said followers to increase the effective pressure against said shoes.

3. In a friction absorbing device, top and bottom followers, a coil spring positioned therebetween, a cylindrical portion on one of said followers extending within said spring, semi-cylindrical friction shoes interlocked with the other of said followers and extending within said cylindrical portion, and a conical resilient member having its opposite ends in abutment with said followers respectively and in engagement with said shoes adjacent one of said followers, said resilient member being compressible between said followers to increase the effective pressure against said shoes, said resilient member being so arranged between said shoes and followers as to afford compression therebetween without abrasive action thereagainst.

4. In a friction absorbing device, top and bottom followers having inwardly directed studs, a coil spring extending between said followers, one of said followers having a cylindrical portion with friction surfaces internally formed thereon, friction shoes interlocked with the other of said followers and slidably seated against said surfaces, and a tapered resilient member interposed between said studs in engagement with said shoes adjacent one of said studs, said shoes overlapping the other of said studs as said device is compressed, said resilient member being so positioned between said studs and said shoes as to afford compression therebetween without abrasive movement thereagainst.

5. In a friction absorbing device, top and bottom followers, a coil spring therebetween, one of said followers having a cylindrical housing extending within said spring, friction shoes having means interlocked with the other of said followers, said shoes being received within said housing for frictional engagement therewith, and a resilient member having a body portion of cylindrical form merging into a portion of frusto-conical form, said cylindrical portion being seated on one of said followers and having abutment with said shoes to urge them into engagement with said housing.

6. In a friction absorbing device, top and bottom followers, a coil spring seated therebetween, one of said followers having a cylindrical portion sleeved within said spring, semi-cylindrical shoes received within said portion infrictional engagement therewith, interlocking means on said shoes and said bottom follower, and a resilient member of conical form seated on said bottom follower with a portion thereof in compression between said shoes, said resilient member having abutment with said followers at its opposite ends respectively for compression therebetween.

7. In a friction absorbing device, top and bottom followers, a coil spring positioned therebetween, a cylindrical portion on one of said followers extending within said spring, semi-cylindrical friction shoes interlocked with the other of said followers and extending within said cylindrical portion, and a tapered resilient member having its opposite ends in abutment with said followers respectively and having one end in engagement with said shoes adjacent one of said followers, said resilient member being compressible between said followers to increase the effective pressure against said shoes.

8. In a friction absorbing device, top and bottom followers having inwardly directed studs, a coil spring extending between said followers, one of said followers having a cylindrical portion with friction surfaces internally formed thereon, friction shoes interlocked with the other of said followers and slidably seated against said surfaces, and a resilient member between said studs with a cylindrical portion engaging said shoes and one follower and with a portion of decreasing cross section extending toward the other follower for abutment therewith, said shoes extending within said cylindrical portion around the other of said studs as said device is compressed.

9. In a friction absorbing device, top and bottom followers, a coil spring therebetween, one of said followers having a cylindrical housing extending within said spring, friction shoes having means interlocked with the other of said followers, said shoes being received within said housing for frictional engagement therewith, and a resilient member having a body portion of cylindrical form merging into a portion of frusto-conical form, said cylindrical portion having abutment with said shoes to urge them into engagement with said housing.

10. In a friction absorbing device, top and bottom followers, a coil spring therebetween, a cylindrical portion with friction walls on one of said followers extending within said spring, semi-cylindrical shoes interlocked with the other of said followers and in slidable engagement with said walls, and a resilient member between said followers in abutment with said shoes adjacent one of said followers, said member being compressible between said followers to afford increased engagement against said shoes without abrasive action thereagainst.

11. In a friction absorbing device, top and bottom followers, a coil spring positioned therebetween, a cylindrical portion on one of said followers extending within said spring, semi-cylindrical friction shoes interlocked with the other of said followers and extending within said cylindrical portion, and a tapered resilient member having its opposite ends in abutment with said followers respectively and having one end in engagement with said shoes adjacent one of said followers.

12. In a friction absorbing device, top and bottom followers, a coil spring therebetween, one of said followers having walls with internal friction surfaces extending within said spring, friction shoes interlocked with the other of said followers and seated against said surfaces, and a resilient member extending between said followers in abutment with said shoes adjacent one of said followers, said resilient member having bearing against said shoes adjacent the other of said followers as said device is compressed.

13. In a friction absorbing device, top and bottom followers, a coil spring therebetween, one of said followers having walls with internal friction surfaces extending within said spring, friction shoes interlocked with the other of said followers and seated against said surfaces and a tapered resilient member under compression between said followers and said shoes.

14. In a friction absorbing device, top and bottom followers, a coil spring therebetween, a cylindrical portion with friction walls on one of said followers extending within said spring, semi-cylindrical shoes interlocked with the other of said followers and in slidable engagement with said walls, and a conical resilient member under compression between said followers and said shoes.

15. In a friction device, a compression spring, end followers seated thereon, frictionally engaging means having telescopic relationship within said spring, certain of said friction means comprising segmental members interlocked with one of said followers, and a tapered resilient member compressed between said followers and said members.

16. In a friction energy absorbing device, a coil spring, end followers seated thereon, frictionally engaging means having telescopic relationship and extending within said spring, said means comprising a housing on one of said followers and friction members interlocked with the other of said followers, and a conical resilient member compressed between said followers for urging said members outwardlly into tight engagement with said housing.

17. In a friction absorbing device, end followers, a coil spring therebetween, friction means comprising a casing on one of said followers and segmental shoes interlocked with the other of said followers and having telescopic relationship with said casing, and a tapered resilient member compressed between said followers and abutting said shoes without abrasion during operation.

18. In a friction absorbing device, end followers, a coil spring therebetween, one of said followers having walls with internal friction surfaces extending within said spring, friction shoes interlocked with the other of said followers and engaging said surfaces, and a resilient member interposed between said followers and having a cylindrical portion abutting said shoes and a tapered expansible portion abutting said shoes during operation.

19. In a friction absorbing device, end followers, a coil spring therebetween, one of said followers having walls with internal friction surfaces extending within said spring, friction shoes interlocked with the other of said followers and engaging said surfaces, and a conical resilient member urging said shoes outwardly when compressed and flowing in abutment therealong without abrasion.

20. In a friction absorbing device, end followers, a coil spring interposed therebetween, one of said followers having a housing extending within said spring and presenting internal friction surfaces, friction shoes associated with the other follower and having faces engaging said surfaces, and a rubber member under compression between said shoes having one end in abutment with one follower and including a portion formed with its cross section decreasing toward the opposite end of said member for abutment with the other follower.

ROBERT B. COTTRELL.
WILLIAM S. SPIETH.